United States Patent
Ninan et al.

(10) Patent No.: US 10,262,603 B2
(45) Date of Patent: Apr. 16, 2019

(54) GLOBAL LIGHT COMPENSATION IN A VARIETY OF DISPLAYS

(71) Applicant: Dolby Laboratories Licensing Corporation, San Francisco, CA (US)

(72) Inventors: Ajit Ninan, San Jose, CA (US); Chun Chi Wan, Campbell, CA (US)

(73) Assignee: Dolby Laboratories Licensing Corporation, San Francisco, CA (US)

(*) Notice: Subject to any disclaimer, the term of this patent is extended or adjusted under 35 U.S.C. 154(b) by 108 days.

(21) Appl. No.: 15/128,348

(22) PCT Filed: Mar. 19, 2015

(86) PCT No.: PCT/US2015/021380
§ 371 (c)(1),
(2) Date: Sep. 22, 2016

(87) PCT Pub. No.: WO2015/148244
PCT Pub. Date: Oct. 1, 2015

(65) Prior Publication Data
US 2018/0174534 A1  Jun. 21, 2018

Related U.S. Application Data

(60) Provisional application No. 61/970,804, filed on Mar. 26, 2014.

(51) Int. Cl.
*G09G 3/36* (2006.01)
*G02F 1/1335* (2006.01)
(Continued)

(52) U.S. Cl.
CPC ........... *G09G 3/3607* (2013.01); *G02B 6/004* (2013.01); *G02B 6/005* (2013.01); *G02B 6/007* (2013.01);
(Continued)

(58) Field of Classification Search
CPC ...... G09G 3/3607; G09G 3/32; G09G 3/3413; G02B 6/004; G02B 6/005; G02B 6/007;
(Continued)

(56) References Cited

U.S. PATENT DOCUMENTS 5,090,794 A   2/1992  Hatano
5,138,441 A   8/1992  Tanaka
(Continued)

FOREIGN PATENT DOCUMENTS

CN   1605041   4/2005
CN   1732717   2/2006
(Continued)

OTHER PUBLICATIONS

Green, Kate, "How Quantum Dots Will Make LCDs Better", Dec. 9, 2009, QD Vision.
(Continued)

*Primary Examiner* — Antonio Xavier (57) ABSTRACT

A non-uniform illumination pattern is determined with a display panel of a display device. The non-uniform illumination pattern comprises different values of the one or more illumination properties in first and second spatial regions of the display panel. An illumination compensation pattern is generated based at least in part on the non-uniform illumination pattern. The illumination compensation pattern is configured to homogenize values of the illumination properties in a plurality of spatial regions of the display panel that include the first and second spatial regions, and implemented in the display device.

6 Claims, 7 Drawing Sheets

(51) Int. Cl.
*F21V 8/00* (2006.01)
*G09G 3/34* (2006.01)
*G09G 3/32* (2016.01)

(52) U.S. Cl.
CPC ......... *G02B 6/0061* (2013.01); *G02B 6/0073* (2013.01); *G02F 1/133603* (2013.01); *G02F 1/133611* (2013.01); *G02F 1/133615* (2013.01); *G09G 3/32* (2013.01); *G09G 3/3406* (2013.01); *G09G 3/3413* (2013.01); *G02B 6/0035* (2013.01); *G02F 2001/133614* (2013.01); *G09G 2320/0233* (2013.01); *G09G 2320/0285* (2013.01); *G09G 2320/0693* (2013.01); *G09G 2360/145* (2013.01)

(58) Field of Classification Search
CPC ............. G02B 6/0073; G06F 1/133603; G06F 1/133615
See application file for complete search history.

(56) References Cited

U.S. PATENT DOCUMENTS

| | | | |
|---|---|---|---|
| 5,666,174 | A | 9/1997 | Cupolo, III |
| 5,731,794 | A | 3/1998 | Miyazawa |
| 5,737,045 | A | 4/1998 | Abileah |
| 5,754,159 | A | 5/1998 | Wood |
| 5,774,257 | A | 6/1998 | Shibata |
| 5,920,361 | A | 7/1999 | Gibeau |
| 6,031,328 | A | 2/2000 | Nakamoto |
| 6,470,115 | B1 | 10/2002 | Yonekubo |
| 6,608,439 | B1 | 8/2003 | Sokolik |
| 6,864,626 | B1 | 3/2005 | Weiss |
| 7,048,427 | B2 | 5/2006 | Fujino |
| 7,126,254 | B2 | 10/2006 | Nanataki |
| 7,230,603 | B2 | 6/2007 | Yamamoto |
| 7,420,323 | B2 | 9/2008 | Krummacher |
| 7,430,022 | B2 | 9/2008 | Hekstra |
| 7,465,104 | B2 | 12/2008 | Tokui |
| 7,481,562 | B2 | 1/2009 | Chua |
| 7,486,854 | B2 | 2/2009 | Van Ostrand |
| 7,498,534 | B2 | 3/2009 | Hoyle |
| 7,537,947 | B2 | 5/2009 | Smith |
| 7,649,594 | B2 | 1/2010 | Kim |
| 7,686,493 | B2 | 3/2010 | Roshan |
| 7,696,684 | B2 | 4/2010 | Weiss |
| 7,733,017 | B2 | 6/2010 | Shapiro |
| 7,746,423 | B2 | 6/2010 | Im |
| 7,751,663 | B2 | 7/2010 | Van Ostrand |
| 7,768,023 | B2 | 8/2010 | Diana |
| 7,845,822 | B2 | 12/2010 | Bierhuizen |
| 7,858,409 | B2 | 12/2010 | Kessels |
| 7,982,812 | B2 | 7/2011 | Rho |
| 7,988,311 | B2 | 8/2011 | Helbing |
| 8,026,661 | B2 | 9/2011 | Weiss |
| 8,035,772 | B2 | 10/2011 | Kim |
| 8,075,148 | B2 | 12/2011 | Nada |
| 8,164,820 | B2 | 4/2012 | Cho |
| 8,203,785 | B2 | 6/2012 | Kindler |
| 8,210,701 | B2 | 7/2012 | Igarashi |
| 8,215,815 | B2 | 7/2012 | Meir |
| 8,242,679 | B2 | 8/2012 | Noh |
| 8,294,168 | B2 * | 10/2012 | Park ............... H01L 25/0753 257/98 |
| 8,684,546 | B2 | 4/2014 | Ninan |
| 8,773,453 | B2 | 7/2014 | Ninan |
| 2001/0008395 | A1 | 7/2001 | Yamamoto |
| 2003/0117546 | A1 | 6/2003 | Conner |
| 2004/0061708 | A1 | 4/2004 | Oh |
| 2005/0269950 | A1 | 12/2005 | Giraldo |
| 2006/0056197 | A1 | 3/2006 | Robinson |
| 2006/0103589 | A1 | 5/2006 | Chua |
| 2006/0104058 | A1 * | 5/2006 | Chemel ............ H05B 33/0842 362/231 |
| 2006/0109682 | A1 | 5/2006 | Ko |
| 2006/0121371 | A1 | 6/2006 | Wu |
| 2006/0221012 | A1 | 10/2006 | Ikeda |
| 2006/0221021 | A1 | 10/2006 | Hajjar |
| 2006/0221022 | A1 | 10/2006 | Hajjar |
| 2006/0238103 | A1 | 10/2006 | Choi |
| 2006/0244367 | A1 | 11/2006 | Im |
| 2007/0029560 | A1 | 2/2007 | Su |
| 2007/0096141 | A1 | 5/2007 | Chen |
| 2007/0139449 | A1 * | 6/2007 | Bergquist ............ G09G 3/3413 345/691 |
| 2007/0171186 | A1 | 7/2007 | Chang |
| 2007/0242028 | A1 | 10/2007 | Kitagawa |
| 2007/0247573 | A1 | 10/2007 | Ouderkirk |
| 2007/0268240 | A1 | 11/2007 | Lee |
| 2008/0007172 | A1 | 1/2008 | Tan |
| 2008/0136758 | A1 | 6/2008 | Ohta |
| 2008/0172197 | A1 | 7/2008 | Skipor |
| 2008/0215279 | A1 | 9/2008 | Salsbury |
| 2008/0225520 | A1 | 9/2008 | Garbus |
| 2008/0230795 | A1 | 9/2008 | Dias |
| 2009/0034292 | A1 | 2/2009 | Pokrovskiy |
| 2009/0039448 | A1 | 2/2009 | Chuang |
| 2009/0059554 | A1 | 3/2009 | Skipor |
| 2009/0091689 | A1 | 4/2009 | Rho |
| 2009/0109517 | A1 | 4/2009 | Cho |
| 2009/0116232 | A1 * | 5/2009 | Chang ............... H05B 33/0818 362/231 |
| 2009/0146933 | A1 | 6/2009 | Visser |
| 2009/0162011 | A1 | 6/2009 | Coe-Sullivan |
| 2009/0180055 | A1 | 7/2009 | Kim |
| 2009/0190095 | A1 | 7/2009 | Ellinger |
| 2009/0194774 | A1 | 8/2009 | Huang |
| 2009/0196014 | A1 | 8/2009 | Hsiao |
| 2009/0213294 | A1 | 8/2009 | Jung |
| 2009/0231831 | A1 | 9/2009 | Hsiao |
| 2009/0285478 | A1 * | 11/2009 | Thiebaud ................ H04N 1/60 382/166 |
| 2009/0311939 | A1 * | 12/2009 | Elliott .................. G06F 3/1446 445/3 |
| 2009/0322800 | A1 | 12/2009 | Atkins |
| 2010/0020242 | A1 * | 1/2010 | Lammers ................ G09G 5/02 348/642 |
| 2010/0079704 | A1 | 4/2010 | Cho |
| 2010/0084674 | A1 | 4/2010 | Paetzold |
| 2010/0102251 | A1 | 4/2010 | Ferrini |
| 2010/0102340 | A1 | 4/2010 | Ooya |
| 2010/0110098 | A1 * | 5/2010 | Wang .................. G09G 3/3413 345/589 |
| 2010/0117997 | A1 | 5/2010 | Haase |
| 2010/0123155 | A1 | 5/2010 | Pickett |
| 2010/0123839 | A1 | 5/2010 | Lu |
| 2010/0155749 | A1 | 6/2010 | Chen |
| 2010/0172138 | A1 | 7/2010 | Richardson |
| 2010/0177091 | A1 | 7/2010 | Hioki |
| 2010/0193806 | A1 | 8/2010 | Byun |
| 2010/0207865 | A1 | 8/2010 | Auld |
| 2010/0208172 | A1 | 8/2010 | Jang |
| 2010/0208493 | A1 | 8/2010 | Choi |
| 2010/0214282 | A1 | 8/2010 | Whitehead |
| 2010/0246160 | A1 | 9/2010 | Ito |
| 2010/0283036 | A1 | 11/2010 | Coe-Sullivan |
| 2010/0283072 | A1 | 11/2010 | Kazlas |
| 2010/0289819 | A1 | 11/2010 | Singh |
| 2010/0309217 | A1 * | 12/2010 | Greenebaum ............ G09G 5/02 345/590 |
| 2011/0122170 | A1 | 5/2011 | Kim |
| 2011/0176328 | A1 | 7/2011 | Anandan |
| 2011/0205251 | A1 | 8/2011 | Auld |
| 2011/0273495 | A1 * | 11/2011 | Ward .................. G09G 3/3413 345/694 |
| 2011/0299011 | A1 | 12/2011 | Weiss |
| 2011/0312116 | A1 | 12/2011 | Weiss |
| 2011/0317097 | A1 | 12/2011 | Kim |
| 2012/0038286 | A1 | 2/2012 | Hasnain |
| 2012/0050632 | A1 | 3/2012 | Shih |
| 2012/0074851 | A1 * | 3/2012 | Erinjippurath ........... G09G 3/20 315/158 |

(56) References Cited

U.S. PATENT DOCUMENTS

| | | | |
|---|---|---|---|
| 2012/0075435 A1* | 3/2012 | Hovanky | H04N 13/02 348/51 |
| 2012/0113672 A1* | 5/2012 | Dubrow | B82Y 20/00 362/602 |
| 2012/0154417 A1* | 6/2012 | Ninan | G02B 27/2264 345/581 |
| 2012/0154422 A1 | 6/2012 | Ninan | |
| 2012/0154464 A1* | 6/2012 | Ninan | G02B 27/2264 345/691 |
| 2012/0274882 A1 | 11/2012 | Jung | |
| 2012/0287381 A1 | 11/2012 | Li | |
| 2013/0050293 A1 | 2/2013 | Feng | |
| 2013/0100692 A1* | 4/2013 | Yokobayashi | H01L 33/504 362/509 |
| 2013/0201661 A1 | 8/2013 | Mehrle | |
| 2013/0215136 A1 | 8/2013 | Jiao | |
| 2013/0293596 A1 | 11/2013 | Atkins | |
| 2013/0335677 A1 | 12/2013 | You | |
| 2013/0342558 A1 | 12/2013 | Sasaki | |
| 2014/0043847 A1* | 2/2014 | Yang | G02B 6/0076 362/606 |
| 2014/0204007 A1* | 7/2014 | Peana | G09G 3/3607 345/88 |
| 2014/0231788 A1* | 8/2014 | Krall | H01L 27/3239 257/40 |
| 2014/0333660 A1* | 11/2014 | Ballestad | G09G 5/00 345/593 |
| 2016/0027368 A1* | 1/2016 | Guo | G02F 1/133514 345/694 |

FOREIGN PATENT DOCUMENTS

| | | |
|---|---|---|
| CN | 1841471 | 10/2006 |
| CN | 1841487 | 10/2006 |
| CN | 1854857 | 11/2006 |
| CN | 201062757 | 5/2008 |
| CN | 101218621 | 7/2008 |
| CN | 101243557 | 8/2008 |
| CN | 101322247 | 12/2008 |
| CN | 101484841 | 7/2009 |
| CN | 101512697 | 8/2009 |
| EP | 0154953 | 9/1985 |
| EP | 1521235 | 4/2005 |
| EP | 1579733 | 9/2005 |
| EP | 1922763 | 5/2008 |
| EP | 2365384 | 9/2011 |
| JP | 2-78393 | 3/1990 |
| JP | 2003-346530 | 12/2003 |
| JP | 2004-325647 | 11/2004 |
| JP | 2005-258248 | 9/2005 |
| JP | 2006-114909 | 4/2006 |
| JP | 2007-058209 | 3/2007 |
| JP | 2008-507735 | 3/2008 |
| JP | 2008-096547 | 4/2008 |
| JP | 2008-538145 | 10/2008 |
| JP | 2009-251129 | 10/2009 |
| JP | 2009-267239 | 11/2009 |
| JP | 2010-525555 | 7/2010 |
| JP | 2012-500996 | 1/2012 |
| JP | 2012-505435 | 3/2012 |
| JP | 2013-161053 | 8/2013 |
| KR | 2000-0014574 | 3/2000 |
| KR | 2002-0045461 | 6/2002 |
| KR | 10-2005-0021548 | 3/2005 |
| KR | 10-2005-0046816 | 5/2005 |
| KR | 2007-0024893 | 3/2007 |
| KR | 2008-0041780 | 5/2008 |
| KR | 10-2010-0039910 | 4/2010 |
| KR | 2008-0012246 | 2/2011 |
| KR | 2011-0072210 | 6/2011 |
| KR | 2012-0078883 | 7/2012 |
| KR | 2013-0000506 | 1/2013 |
| WO | 00/17903 | 3/2000 |
| WO | 03/021340 | 3/2003 |
| WO | 03/058726 | 7/2003 |
| WO | 2004/010406 | 1/2004 |
| WO | 2004/032523 | 4/2004 |
| WO | 2004/060024 | 7/2004 |
| WO | 2006/107720 | 10/2006 |
| WO | 2007/020556 | 2/2007 |
| WO | 2007/114918 | 10/2007 |
| WO | 2009/041574 | 4/2009 |
| WO | 2009/041594 | 4/2009 |
| WO | 2009/078426 | 6/2009 |
| WO | 2009/101727 | 8/2009 |
| WO | 2010/058162 | 5/2010 |
| WO | 2011/031802 | 3/2011 |
| WO | 2012/082825 | 6/2012 |
| WO | 2013/028900 | 2/2013 |
| WO | 2013/188298 | 12/2013 |
| WO | 2014/025677 | 2/2014 |
| WO | 2014/137565 | 9/2014 |

OTHER PUBLICATIONS

Nanoco Technologies "The Future of Cadmium Free QD Display Technology" Apr. 2011.
Nanosys and LG Close to Bringing Quantun Dot Technology to LCD Displays, Nov. 4, 2010.
Quantum Dot LCD HDTV, Dec. 31, 2009.

* cited by examiner

GLOBAL LIGHT COMPENSATION IN A VARIETY OF DISPLAYS

CROSS-REFERENCE TO RELATED APPLICATION

This application claims priority to U.S. Provisional Application No. 61/970,804 filed 26 Mar. 2014 and entitled "Global Light Compensation in a Variety of Displays" which is hereby incorporated by reference in its entirety.

TECHNOLOGY

The present invention relates generally to display techniques, and in particular, to display techniques using direct-lit or side-lit light units.

BACKGROUND

Backlight used to illuminate a display panel comprising light valves (e.g., LCD pixels or sub-pixels) often suffer from light field non-uniformity and color shift. As a result, the display panel may render images that contain undesired color tints in certain regions of the images. While such visual artifacts are present in a wide variety of displays, actual patterns of non-uniformity and color shift are dependent on different backlight designs and components used in the displays.

For example, a backlight comprising quantum dot sheets to generate light of different primary colors may not be able to generate light with the same uniform proportions of the primary colors across all regions of a display panel. A direct-lit display may show non-uniformity and color shift relatively prominently towards the edges of a display panel. A side-lit display may show a gradient pattern of non-uniformity and color shift along a spatial direction of a display panel.

Thus, engineering and manufacturing a display system with wide color gamut and high luminance has been recognized as a costly endeavor by many display manufactures, because of a high number of relatively expensive optical, audio, electronic and mechanical components involved and the complexity in integrating all of them into a single system.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which.

DESCRIPTION OF EXAMPLE EMBODIMENTS

Example embodiments, which relate to global light compensation techniques, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:

1. General Overview
2. Structure Overview
3. Non-Uniform Illumination Pattern
4. Light Compensation
5. Light Compensation Implementation
6. Light Compensation Layers
7. Example Process Flow
8. Implementation Mechanisms—Hardware Overview
9. Equivalents, Extensions, Alternatives and Miscellaneous 1. General Overview This overview presents a basic description of some aspects of an embodiment of the present invention. It should be noted that this overview is not an extensive or exhaustive summary of aspects of the embodiment. Moreover, it should be noted that this overview is not intended to be understood as identifying any particularly significant aspects or elements of the embodiment, nor as delineating any scope of the embodiment in particular, nor the invention in general. This overview merely presents some concepts that relate to the example embodiment in a condensed and simplified format, and should be understood as merely a conceptual prelude to a more detailed description of example embodiments that follows below.

A backlight unit (BLU) can be used to illuminate a receiving surface of a display panel. The display panel comprises pixel structures with light valves. Transmission states of the pixel structures can be controlled based on pixel values of image frames in order to render the image frames on a surface visible to a user.

In some embodiments, to illuminate the receiving surface of the display panel, backlight from the BLU travels through a number of components such as one or more optical stacks, one or more light regeneration layers, one or more light recycling layers, etc. In non-limiting example implementations, blue or UV light emitted from a BLU may travel through a quantum dot layer that comprise one or more different types of quantum dots to convert at least a portion of the blue or UV backlight into one or more specific types of visible color light such that light illuminated on a receiving surface of a display panel is white light.

Light illumination with constancy in both luminance and color composition (e.g., white point as defined in a video standard, etc.) for each pixel of a display panel is difficult to achieve. Even if homogeneous materials and components are used, efficiency in light regeneration at some spatial regions of the display panel may be different from that at some other spatial regions of the same display panel due to factors relating to geometric locations, aging, usages, etc. For example, a direct-lit display panel with blue backlight may exhibit an illumination pattern that is relatively constant white in much of the interior of the display panel but with varying shades of blue near edges of the display panel because of inefficiency in light regeneration (e.g., of red and green color light, etc.) there. Similarly, a side-lit display panel may exhibit a gradient illumination pattern because of differences in efficiency of light regeneration (e.g., of red and green color light, etc.) caused by differences in distance to light sources.

In some embodiments, a non-uniform illumination pattern on a receiving surface of a display panel may be determined for one or more components in a display device. These components may include but are not limited to only, any of BLUs, optical stacks, light regeneration layers, light recycling layers, etc. The non-uniform illumination pattern can be determined using simulation tools, reference display devices, specific display devices to which light compensation is to be applied, etc., at a device design time, at a device calibration time, at a factory, in the field, etc.

Based on the non-uniform illumination pattern of the one or more components of the display device, an illumination compensation pattern that negates or reduces the non-uniformity of light illumination on a display panel can be generated and implemented in the display device. In some embodiments, at least one of the one or more components that generate the non-linearity can be modified, replaced, etc., with a component that generates compensation. In some embodiments, additional components can be used in conjunction with the one or more components that generate the non-uniform illumination pattern to provide light compensation for the non-uniform illumination pattern. For example, a QD layer may be modified or added so that more red and green QD materials are disposed near edges to raise efficiency in light regeneration of non-blue light for a non-uniform illumination pattern that exhibits blue tints near the edges. A color filter layer with yellow tints near the edges may be used in place of, or in conjunction with, a regular color filter layer. Existing light sources may be modified, replaced, etc., and/or additional light sources may be configured near the edges, for the purpose of generating the illumination compensation pattern that negates or reduces the non-uniformity in light illumination.

In some embodiments, the illumination compensation pattern can be implemented at least in part with a light modulation layer and a light compensation module that generate pixel control data to control the light modulation layer such that transmissive light through the light modulation layer represents and implements the illumination compensation pattern. For example, the light modulation layer may be controlled to eliminate color tint in the non-uniform illumination pattern so that a common white point, a common gamut, etc., are supported by pixels in all spatial regions of a display panel. The light modulation layer may be an addition to, or may be the same as, a (e.g., primary, etc.) light modulation layer that is controlled based on image data comprising image frames to be rendered. Specifically, in some embodiments, a light modulation layer may be jointly controlled based on both the image data comprising the to-be-rendered image frames and the pixel control data comprising an implementation of the illumination compensation pattern.

In some embodiments, the determination of a non-uniform illumination pattern and the generation of an illumination compensation pattern for a display device is performed before the display device is released in the field (e.g., to an end user, etc.). In some embodiments, the determination of a non-uniform illumination pattern and the generation of an illumination compensation pattern for a display device can be performed after the display device is released in the field (e.g., to an end user, etc.) from time to time, on demand, periodically, etc. In some embodiments, the determination of a non-uniform illumination pattern and the generation of an illumination compensation pattern for a display device can also be iteratively performed such that a subsequent illumination compensation pattern can be represented by adjustments to one or more previously generated illumination compensation patterns.

In some embodiments, test images of a viewing surface of a display panel of a display device may be taken by external devices. These test images may be analyzed by the external devices and/or the display device to determine any non-uniformity in light illumination, to generate an illumination compensation pattern, to implement the illumination compensation pattern, etc., in the display device.

In some embodiments, a method comprises providing a display system as described herein. In some embodiments, mechanisms as described herein form a part of a display system, including but not limited to a handheld device, tablet computer, theater system, outdoor display, game machine, television, laptop computer, netbook computer, cellular radiotelephone, electronic book reader, point of sale terminal, desktop computer, computer workstation, computer kiosk, PDA and various other kinds of terminals and display units.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. Structure Overview

Figure 1A:
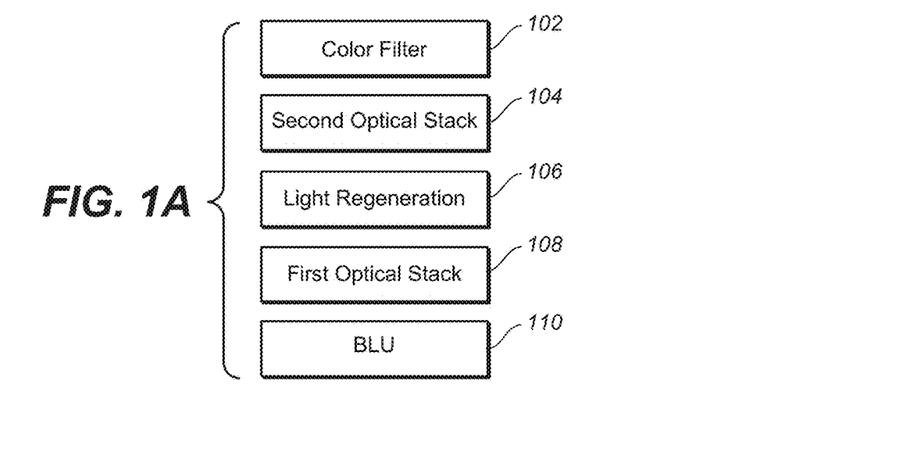
FIG. 1A, FIG. 1B and FIG. 1C illustrate example display system configurations.

FIG. 1A illustrates an example display system configuration comprising a backlight unit (BLU) 110, a first optical stack 108, a light regeneration layer 106, a second optical stack 104, a color filter layer 102, etc. Pixel structures can be implemented in one or more of the illustrated layers in FIG. 1A. In an example embodiment, pixel structures that are used to modulate light intensity of transmissive light are embedded in the color filter layer (102), which may comprise filters of different colors for corresponding pixels (or subpixels), and the second optical stack (104), which may comprise liquid crystal unit structures for corresponding pixels.

Figure 1B:
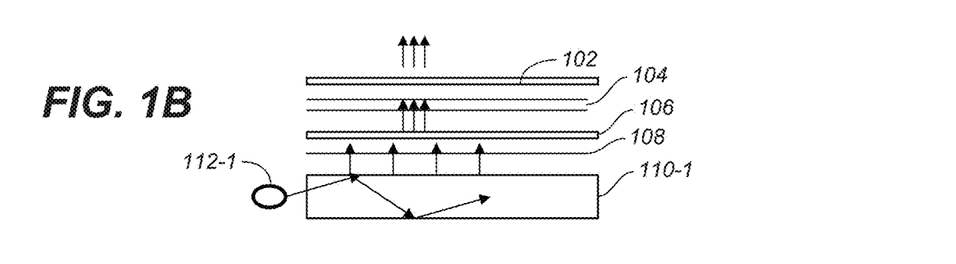

FIG. 1B illustrates an example side-lit display system configuration. As illustrated in FIG. 1B, one or more light sources 112-1 are configured to inject light into a light guide in a BLU 110-1 in a side direction that is different from (e.g., perpendicular to) a light transmission direction in which pixels are illuminated by transmissive light in the side-lit display system.

Figure 1C:
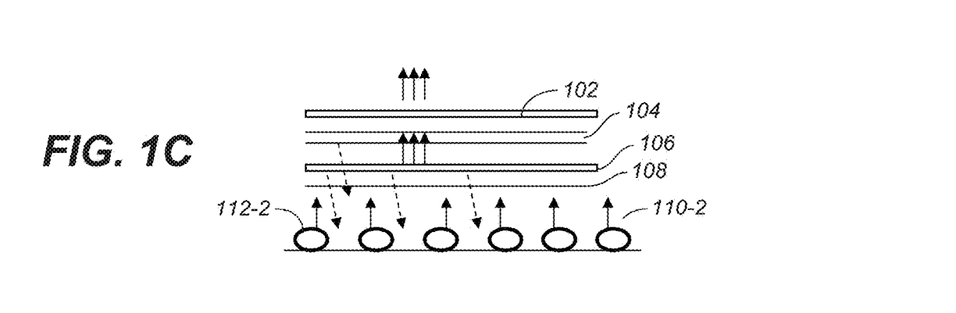

FIG. 1C illustrates an example direct-lit display system configuration. As illustrated in FIG. 1C, one or more light sources 112-2 are configured to inject light in a BLU 110-2 in a direction that is similar to (e.g., substantially aligned with) a light transmission direction in which pixels are illuminated by transmissive light in the direct-lit display system. Other light injection methods, including but limited to those that combine both side-lit and direct-lit light injection methods, may also be used in a display system as described herein.

Light injected by a light source (e.g., 112-1, 112-2, etc.) as described herein may comprise one or more of a wide variety of light wavelength distribution patterns (e.g., spectral components of less than 1 nm, less than 5 nm, between 5 nm and 30 nm inclusive, greater than 30 nm, etc.). Injected light in a BLU (e.g., 110, 110-1, 110-2, etc.) may include but is not limited to: one or more of blue light, violet light, ultraviolet light, etc.

Color filters in display systems (e.g., LCD display systems) can vary from vendor to vendor. In some embodiments, color filters can be preconfigured to absorb much of the light that does not have wavelengths in pass bands of the color filters. In some embodiments, color filters can be preconfigured to reject much of the light that does not have wavelengths in pass bands of the color filters.

Light regeneration materials such as quantum dots can be selected to generate light in specific wavelength bands. In some embodiments, a light source (e.g., 112-1, 112-2, etc.) is configured to emit blue light; a light regeneration layer (e.g., 106, etc.) comprises light regeneration materials configured to convert a portion but not all of the blue light into green and red light. The unconverted blue light and the green and red light converted from the blue light may provide more or less white light on an illuminated surface (e.g., a diffuser surface, a LCD layer, etc.).

It should be noted that other light sources other than blue light sources may be used for light regeneration. For example, a UV light source instead of, or in conjunction with, a blue light source may be used to generate visible light such as blue, red, green from light regeneration materials such as blue quantum dots, red quantum dots, green quantum, dots, etc. It should be noted that other primary colors other than red, green, and blue colors may also be used (e.g., in place of red, green and blue colors; in conjunction with red, green and blue colors; etc.) for illumination. It should also be noted that more than three, three, fewer than three primary colors may be used in a color system adopted by a display system.

A light regeneration layer may, but is not limited to, be formed by adding QD, remote phosphor (RP), or other light regeneration materials to an (e.g., existing or new) optical layer. Light regeneration materials may be coated, attached to, doped, or otherwise disposed on the top surface, the bottom surface, or both surfaces of the optical layer. Light regeneration materials may also be embedded within the optical layer. Light regeneration materials may be disposed with the optical layer in any combination or order of various disposition methods.

A display system (e.g., as illustrated in FIG. 1A, FIG. 1B or FIG. 1C, etc.) may comprise a display panel with an image rendering surface. The display panel may be implemented with one or more components (e.g., polarizers, substrates, liquid crystal layers, filters, switch elements, electrodes, etc.) and comprises a plurality of pixels or pixel structures in a rectangular array pattern, in a non-rectangular pattern, etc.

3. Non-Uniform Illumination Pattern

Ideally, each pixel in the plurality of pixels of the display panel is illuminated with constant light that comprises identical composition of light color combinations (e.g., yielding a white point as defined in a standard or specification such as BT. 709, etc.). However, uniformity in illumination is difficult to accomplish, even if homogeneous materials or components are used to generate the illumination. For example, when a light regeneration layer (e.g., 106, etc.) such as a QD sheet is used as a part of, or in conjunction with, a backlight unit (e.g., 110, 110-1, 110-2, etc.), light generation/conversion at different spatial locations of the light regeneration layer (106) can be different.

For the purpose of illustration only, the light regeneration layer (106) has a shape of a rectangle. Light generation/conversion at the edges of the rectangle of the light regeneration layer (106) may be relatively inefficient as compared with light generation/conversion in the middle of the rectangle of the light regeneration layer (106). This may be caused by a variety of factors including but not limited to insufficient light recycling at the edge of the light regeneration layer (106).

A variety of optical components including light regeneration layers and non light regeneration layers suffers from non-uniformity. For example, light emission from a BLU (e.g., 110, 110-1, 110-2, etc.) of a display system may deteriorate differentially in different spatial regions of a display panel in the display system, because light emitters in the BLU that illuminate certain spatial regions of the display panel may be overused relative to other light emitters in the BLU that illuminate other spatial regions of the display panel. Spatially different aging effects may also affect any of a variety of optical components in a display system to cause spatially non-uniform illumination.

Figure 2A:
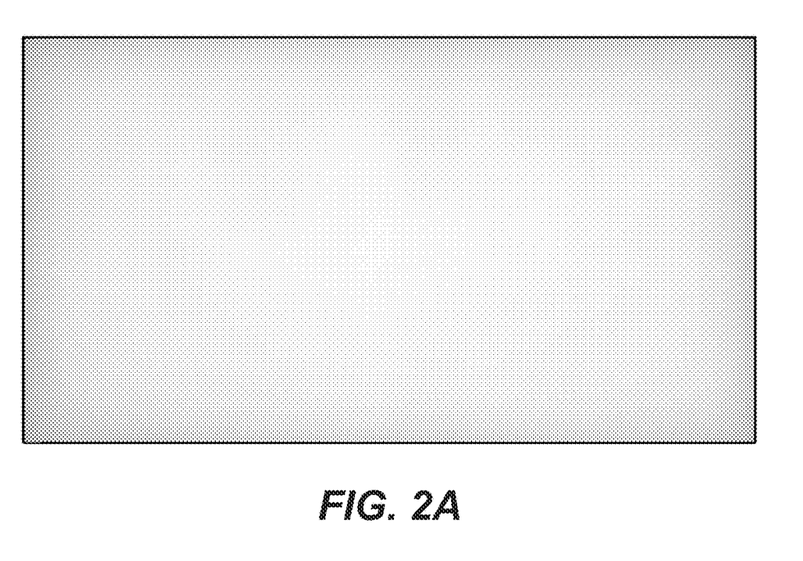
FIG. 2A illustrates example non-uniformity in illumination.

FIG. 2A illustrates example non-uniformity in illumination as generated by a direct-lit display system. In some scenarios, due to inefficient light generation/conversion, edges of an illuminated surface shows a perceptible increase in blue when blue light is used to generate other primary colors. Similarly, a side-lit display system such as shown in FIG. 1B may generate non-uniformity in illumination in the form of one or more gradient patterns along one or more spatial directions (e.g., longitudinal direction relative to a direction of light injection by a side-lit light source 112-1, transverse direction perpendicular to the longitudinal direction, etc.).

Figure 2B:
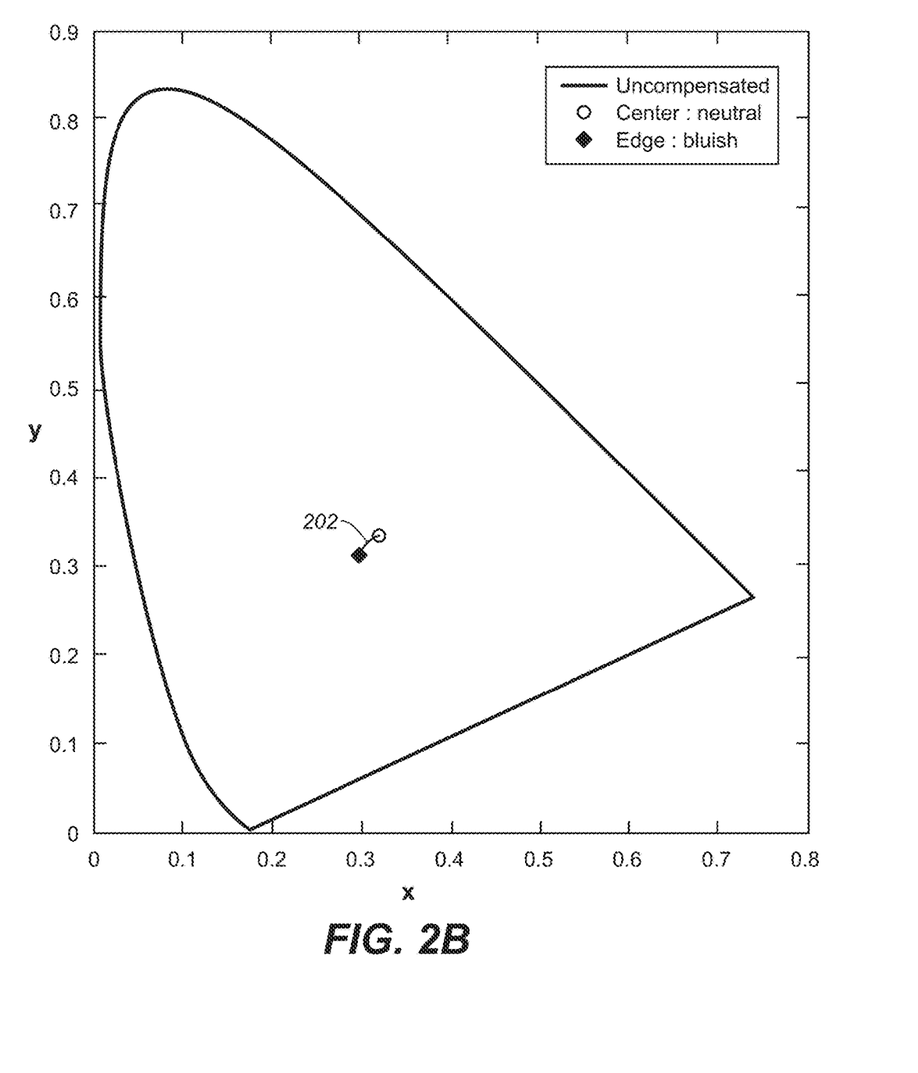
FIG. 2B illustrates example deviations of white points.

FIG. 2B illustrates example deviations of white points in different spatial regions of a display panel due to non-uniformity in illumination. As can be seen in FIG. 2B, the white points of pixels of the display panel may not be located at a single point, but rather may be distributed along a plot 202 in a color gamut 204.

Spatial non-uniformity in illumination affects one or more illumination properties of different spatial regions of a display panel. Examples of illumination properties include, but are not limited to only: any of white points, color gamut, contrast, dark level, bright level, etc. Non-uniformity of luminance levels and non-uniform of color light composition in different spatial regions of a display panel may cause non-uniform white points, color gamut, contrasts, dark levels, bright levels, etc., in these different spatial regions. Differences in color light composition in different spatial regions of a display panel may cause non-uniform unsaturated colors, non-uniform color shifts, etc., that spatially vary in the different spatial regions of the display panel. Differences in luminance levels in different spatial regions of a display panel may cause non-uniform grayscale level variations, contrast variations, dark level variations, bright level variations, etc., that spatially vary in the different spatial regions of the display panel. As a result, visual artifacts may be readily observed by users even in sophisticated display systems.

In some embodiments, a non-uniform illumination pattern on a display panel relating to one or more device components of a display device comprising the display panel is determined. These device components may include, but are not limited to only: one or more of the backlight unit (110), the first optical stack (108), the light regeneration layer (106), the second optical stack (104), the color filter layer (102), etc. In some embodiments, the non-uniform illumination pattern comprises measured values of one or more illumination properties that vary in different spatial regions of the display panel. For example, first measured values may be determined for the illumination properties in a first spatial region of the display panel, whereas second measured values that are different from the first measured values may be determined for the illumination properties in a second spatial region, of the display panel, that is different from the first spatial region of the display panel.

Under techniques as described herein, the non-uniform illumination pattern can be determined by one or more of a variety of methods. In some embodiments, one or more luminance illumination properties are directly measured on a specific display device that luminance compensation is to be applied. The direct measurements of the luminance illumination properties of the specific display device can be used to construct/detect/determine a non-uniform illumination pattern such as illustrated in FIG. 2A and FIG. 2B for the specific display device.

In some embodiments, one or more luminance illumination properties are measured on a reference display device that represents a class of display devices to which luminance compensation is to be applied. The measurements of the luminance illumination properties of the reference display device can be used to construct/detect/determine a (e.g., representative, reference, etc.) non-uniform illumination pattern such as illustrated in FIG. 2A and FIG. 2B for the class of display devices. Example display devices in a class of display devices may include, but are not limited only to, a plurality of display devices that implement an optical design similar to or the same as that of the reference display device, etc. The non-uniform illumination pattern determined from the reference display device may be used to represent a non-uniform illumination pattern of any display device in the class of the display devices.

In some embodiments, one or more simulation tools may be used to simulate the optical design of a class of display devices to which luminance compensation is to be applied. One or more luminance illumination properties may be computationally determined based on simulated data generated by the simulation tools. Computed values of the luminance illumination properties of the display device model can be used to construct/detect/determine a (e.g., representative, reference, etc.) non-uniform illumination pattern such as illustrated in FIG. 2A and FIG. 2B for the class of display devices. Example display devices in a class of display devices may include, but are not limited only to, a plurality of display devices that implement an optical design similar to or the same as that simulated by the simulation tools, etc. The non-uniform illumination pattern determined by the simulation tools may be used to represent a non-uniform illumination pattern of any display device in the class of the display devices.

It should be noted that methods to determine non-uniform illumination patterns are not necessarily mutually exclusive. In some embodiments, only a single method is used to determine a non-uniform illumination pattern of a specific display device. In some embodiments, two or more different methods are combined to determine a non-uniform illumination pattern of a specific display device.

Under techniques as described herein, a determination of a non-uniform illumination pattern of a display device can be made at any of a variety of times such as at device design time, in a factory (e.g., as a part of factory calibration, etc.), after the display device has been released for use, etc. Non-uniform illumination may vary over the time. In some embodiments, determinations of non-uniform illumination patterns of a specific device over the time may be made from time to time, periodically, on demand, etc. Such determinations can also be iterative; for example, a later determination may use the results of an earlier determination such as factory measurements as a basis in order to determine any change in the non-uniformity of illumination, determine any corresponding change of light compensation, etc.

A determination of a non-uniform illumination pattern may or may not use one or more test images. In some embodiments, a grayscale (e.g., black, gray, white, red, green, blue, uniform, etc.) test image, which may be preprogrammed or stored at a display device, may be used to determine non-uniform illumination of different spatial regions of a display panel.

In some embodiments, a variety of voltage levels (e.g., maximum, intermediate, minimum, constant, patterned, serial, parallel, etc.) may be applied (e.g., through electrodes, etc.) to a light modulation layer without a test image to determine non-uniform illumination of different spatial regions of a display panel.

In some embodiments, one or more color imaging instruments, color metering devices, etc., are used to measure illumination at a pixel level, at a spatial region level, etc., by one or more of scanning or non-scanning methods. In some embodiments, color space values such as CIE X, Y, Z values, RGB colors, etc., at a pixel, a spatial region, etc., are obtained from results of illumination measurements. These color space values can be used to determine individual white points and color gamuts at a pixel level, at a spatial region level, etc., from which a non-uniform illumination pattern is derived. In some embodiments, matrixes, tables, (e.g., analytic, non-analytic, piecewise, etc.) functions, curve segments, line segments, etc., may be used to represent or approximate the non-uniform illumination pattern.

4. Light Compensation

In some embodiments, an illumination compensation pattern can be determined or created based on the non-uniform illumination pattern. In an example, spatially varying deviations or non-uniformity relative to a specific white point, a specific color gamut, may be represented by transformation matrixes (e.g., a plurality of 3×3 matrixes each representing transformations from CIE X, Y and Z values defining the specific white point, from RGB values defining the specific color gamut, etc.). Inverse transformation matrixes that negate the deviations and non-uniformity represented by the transformation matrixes may be computed as inverses of the transformation matrixes. The inverse transformation matrixes may be used to represent an illumination compensation pattern that needs to be implemented in a display device to counter the spatially varying deviations or non-uniformity.

In another example, deviations or non-uniformity relative to a specific white point, a specific color gamut, may be represented by transform functions. Inverse transform functions that negate the deviations and non-uniformity represented by the transform matrixes may be computed as inverse functions to the transform functions. The inverse transform functions may be used to represent an illumination compensation pattern that needs to be implemented in a display device to counter the spatially varying deviations or non-uniformity.

It should be noted that transformation matrixes, transform functions, [inverse transformation matrixes, inverse transform functions], etc., as discussed above, may be generated for different levels of spatial granularity. For example, a transformation matrix, a transform function, etc., as described herein can be generated for each pixel, for each pixel block, for each spatial region of a display panel, etc. Additionally, optionally, or alternatively, a transformation matrix, a transform function, etc., as described herein can be related to a specific color, to two or more colors, etc. In some embodiments, an element in a transformation matrix may be represented by a function. In some embodiments, a transform function may be represented as a vector, a matrix, etc., with multiple elements.

It should be noted that other ways of representing spatially varying deviations and non-uniformity may be used in place of, or in conjunction with, transformation matrixes and transform functions as discussed above. Similarly, other ways of representing spatially varying illumination compensation may be used in place of, or in conjunction with, inverse transformation matrixes and inverse transform functions as discussed above.

In some embodiments, a spatial location of a pixel, a spatial region on a display panel can be represented by coordinates such as x and y, where x represents a first dimension and y represents a second different dimension. Transformation matrixes, transform functions, inverses of the foregoing, etc., as discussed above may be expressions generally dependent on and varying with spatial locations (e.g., as represented by values of x and y, etc.) of pixels, spatial regions, etc.

In some embodiments, one or more of these expressions may be further reduced to, or approximated by, products of simpler expressions. In some embodiments, a transform function of two variables x and y may be approximated by, or decomposed into, a product of two functions of a single variable, one of which is a function of x and the other of which is a function of y. For example, the function of x in a direct-lit display device may be used to capture relatively constant compositions of primary colors in the middle of a first dimension of a display panel and relatively varying composition of primary colors near edges of the first dimension of the display panel.

Similarly, the function of y in a direct-lit display device may be used to capture relatively constant compositions of primary colors in the middle of a second dimension (e.g., perpendicular to the first dimension, etc.) of a display panel and relatively varying composition of primary colors near edges of the second dimension of the display panel. In some embodiments, a transform function of two variables x and y may be approximated by, or decomposed into, a function of a single variable. For example, the transform function may be reduced to a single function of x in a side-lit display device that captures a gradient pattern in the composition of primary colors in a first dimension of a display panel, as the composition of primary colors may be relatively constant along a second dimension (e.g., perpendicular to the first dimension, etc.) of the display panel.

In some embodiments, non-uniform corrections, perturbations, etc., may be added to a transformation matrix, a transform function, etc. In some embodiments, analytical functions such as polynomial expressions comprising zero-th order terms, first-order terms, second-order terms, etc., may be used to approximate one or more expressions or one or more functional factors/terms therein. In an example, the zero-th order terms may be used as main terms that capture a relatively constant pattern in the composition of primary colors, while the first-order terms (e.g., piecewise linear segments, etc.) may be used as corrections/perturbation terms that capture small magnitude changes to the relatively constant pattern near edges of a display panel. In another example, the first-order terms may be used as main terms that capture a gradient pattern, while the second-order terms may be used as corrections/perturbation terms that capture small magnitude changes to the gradient pattern.

Thus, depending on requirements (e.g., high-end devices with high accuracies, etc.) on accuracy, various ways of approximating non-uniform illumination patterns and illumination compensation patterns can be used in various embodiments, for example, to simply the non-uniformity measurement process, to compress the amount of operational parameter values required to perform light compensation in real time or in near real time, to simply the task of manufacturing light compensation components, etc.

In some embodiments, instead of performing illumination measurements for every possible combinations of x and y, illumination measurements may be made for x and y in two cross sectional lines. The result of the illumination measurements in the two cross sectional lines can be used to approximate, extrapolate, derive, etc., the overall illumination pattern.

In some embodiments, to generate a relatively accurate non-uniform illumination pattern, more illumination measurements may be performed near some spatial regions such as edges of a display panel than in other spatial regions such as at or near the center of the display panel.

5. Light Compensation Implementation

An illumination compensation pattern in a display device can be implemented with one or more of a variety of illumination compensation techniques. Examples of light compensation techniques may include, but are not limited to, any of replacing a homogeneous light regeneration layer with a spatially non-uniform (or non-homogeneous) light regeneration layer, adding a spatially non-uniform light regeneration layer, replacing a color filter layer with a spatially constant pattern with a color filter layer with a spatially non-uniform pattern, adding a color filter layer with a spatially non-uniform pattern, replacing a BLU emitting homogeneous light with a BLU emitting spatially non-uniform (or non-homogeneous) light, adding light emitters to compensate one or more weak or unsaturated colors in specific spatial regions of a display panel, enhancing light modulation of one or more light modulation layers with light compensation logic, adding a light modulation layer modulated by light compensation logic, etc.

Figure 3A:
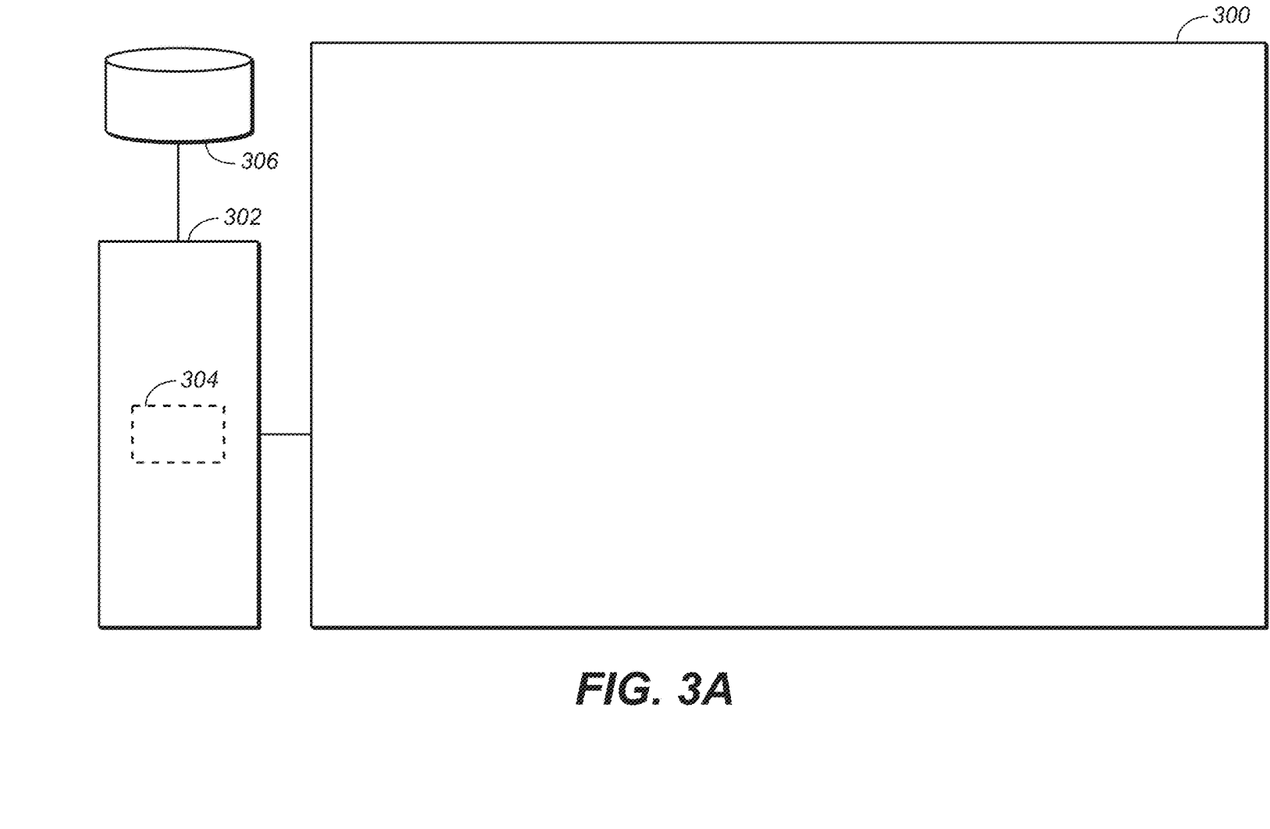
FIG. 3A illustrates an example configuration of a display device.

FIG. 3A illustrates an example configuration of a display device, which may comprise one or more of the components as illustrated in FIG. 1A, FIG. 1B or FIG. 1C. A display controller 302 may be operatively coupled with an image data source 306 (e.g., a set-top box, networked server, storage media or the like) and is configured to receive image data from the image data source (306). The image data may be provided by the image data source (306) in a variety of ways including, but are not limited to only: from a broadcast, from an internet based system, via a High-Definition Multimedia Interface (HDMI), a wireless network interface, other devices (e.g., set-top box, server, storage medium, etc.), etc. Image frames decoded or generated from the image data from an internal or external source may be used by the display controller (302) to drive a number of components of the display device. For example, the display controller (302) may be configured to control one or more light sources of the display device to illuminate a display panel 300 of the display device, set light modulation states of pixels in the display panel (300) of the display device based on the image frames, etc.

In some embodiments, additionally, optionally, or alternatively, the display controller (302) comprises an illumination compensation module 304 configured to control one or more of the component(s) of the display device for illumination compensation.

Figure 3B:
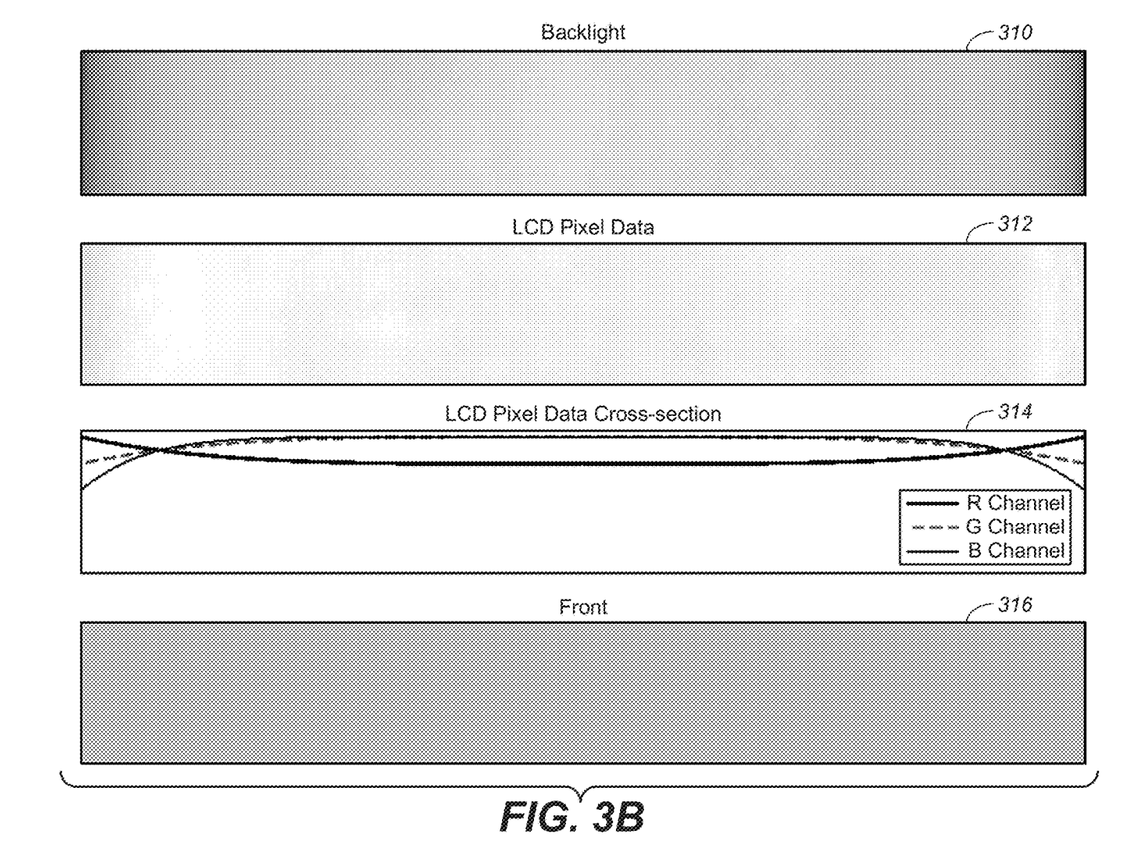
FIG. 3B illustrates example light compensation in a display device.

FIG. 3B illustrates example light compensation in a display device (e.g., a display device as illustrated in FIG. 3A, etc.). In some embodiments, a display panel (e.g., 300 of FIG. 3A, etc.) is illuminated with backlight (e.g., a BLU, a BLU and a light regeneration layer such as a QD sheet, a BLU coated with a light regeneration layer such as a QD thin film, through an optical stack, etc.) in a spatially non-uniform illumination pattern 310.

In some embodiments, the display device, or an illumination compensation module (e.g., 304 of FIG. 3A, etc.) therein, is configured to generate or modify pixel data such as LCD pixel data 312 to comprise a specific pixel data cross section for primary colors such as a LCD pixel data cross-section 314 that generates a non-uniform illumination compensation pattern negating the non-uniform illumination pattern exhibited in the spatially non-uniform illumination pattern 310. The LCD pixel data cross section (314) implemented with the LCD pixel data (312) may be configured to adjust illumination as a function of position/distance in a display panel relative to a reference position/point in the display panel.

As illustrated in FIG. 3B, the LCD pixel data cross section (314) may be configured to boost red light near edges of a display panel (e.g., 300 of FIG. 3A, etc.) that comprises an illuminated surface such as a front surface 316. Additionally, optionally, or alternatively, to compensate for a relatively large loss of red light in the non-uniform illumination pattern (310), the LCD pixel data cross section (314) implemented with the LCD pixel data (312) may be further configured to attenuate green and blue light near edges of the display panel (300) to some extents. As a result, the illuminated surface of the display panel (300) as represented by the front surface (316) is illuminated with an illumination pattern in which the non-uniform illumination pattern (310) has been largely or completely negated or corrected by the light compensation pattern represented by the LCD pixel data cross-section (314).

In some embodiments, a light compensation module such as 304 of FIG. 3A, etc., may be configured to modify image rendering pixel control data that is generated (e.g., by a display controller 302 of FIG. 3A, etc.) based on image data provided by an image data source (e.g., 306 of FIG. 3A, etc.) to control pixels in one or more light modulation layers (e.g., a light modulation layer in an optical stack 104 of FIG. 1A, etc.) for rendering image frames represented in the image data. The modification of image rendering pixel control data is to create an overall illumination compensation pattern— which is apart from the image frames, overlaid with the image frames, superimposed with the image frames, etc.— that is independent of (e.g., invariant with, etc.) the image data and that negates a non-uniform illumination pattern as generated by other components of the display device. In some embodiments, additionally, optionally, or alternatively, the light compensation module (304) can be configured to determine a common white point, a common color gamut, etc., that are to be supported by (e.g., all, over a large threshold percentile such as 98% of all pixels, etc.) pixels of the display panel (300), modify the image rendering pixel control data in accordance with the common white point, a common color gamut, etc., that are to be supported by the pixels of the display panel (300), etc.

In some embodiments, a light compensation module such as 304 of FIG. 3A, etc., may be configured to generate illumination compensation control data, separate from image rendering pixel control data that is generated (e.g., by a display controller 302 of FIG. 3A, etc.) based on image data provided by an image data source (e.g., 306 of FIG. 3A, etc.) to control pixels in one or more light modulation layers (e.g., a light modulation layer in an optical stack 104 of FIG. 1A, etc.) for rendering image frames represented in the image data. The illumination compensation control data is to control pixels, pixel blocks, spatial regions, etc., of one or more additional light modulation layers that are separate from one or more light modulation layer controlled by the image rendering pixel control data, create an overall illumination compensation pattern with the one or more additional light modulation layers. The illumination compensation control data is independent of (e.g., invariant with, etc.) the image data and that negates a non-uniform illumination pattern as generated by other components of the display device.

In some embodiments, a non-uniform illumination pattern can affect both white points and color gamuts at a pixel level, at a pixel block level, at a spatial region level, etc. Color gamuts in some spatial regions of a display panel may be biased relative to other color gamuts in some other spatial regions of the display panel. In some embodiments, uniformity in color gamut across all or substantially all spatial regions of the display panel can be achieved by a largest commonly supported color gamut across all the regions. For example, image portions at the center may be de-saturated to a certain extent in order to match color gamut in non-center spatial regions. In some embodiments, a light compensation module (e.g., 304 of FIG. 3A, etc.) can be configured to determine a common white point, a common color gamut, etc., that are to be supported by (e.g., all, over a large threshold percentile such as 98% of all pixels, etc.) pixels of a display panel (e.g., 300 of FIG. 3A, etc.), generate illumination compensation control data in accordance with the common white point, a common color gamut, etc., that are to be supported by the pixels of the display panel (300), etc.

Components of a display device change over the time. For example, a backlight may deteriorate from its factory released/calibrated properties over time. This deterioration can create visual artifacts from non-uniformity of illumination, especially in direct-lit display devices. Ratios of quantum dot colors in a light regeneration layer may change over time, due to uneven use, aging, etc. High dynamic range display devices may be relatively susceptible to these changes because illumination in these display devices can be relatively intense.

In some embodiments, a one-time illumination compensation algorithm can be computed, for example, at the device calibration time, can simply imported/saved to a display device based on what is developed with a reference display device, simulation tools, etc.

In some embodiments, an illumination compensation module (e.g., 304 of FIG. 3A, etc.) of a display device is configured to make adjustments to illumination compensation after the display device has been delivered to an end user. The adjustments may be made in real time, from time to time, periodically, on demand, etc. In some embodiments, a user may provide user input to the display device to select or control whether and what specific illumination compensation is to be implemented in different spatial regions of a display panel (e.g., 300 of FIG. 3A, etc.). In some embodiments, an external device such as an external device with a camera may be used to capture test images (e.g., a white test image, a blue test image, a red test image, a green test image, etc.) of a display panel (e.g., 300 of FIG. 3A, etc.). The test images captured by the external device can be provided to the display device that is configured to analyze the test images, determine a spatially non-uniform illumination pattern based on the test images, make adjustments to an existing illumination compensation pattern, etc. In some embodiments, adjustments to light compensation may be done iteratively. In some embodiments, light compensation that is independent of rendered image frames can be performed in place of, or alternatively in conjunction with, real time, dynamic, etc., light compensation that is dependent on the rendered image frames.

6. Light Compensation Layers

Figure 4A:
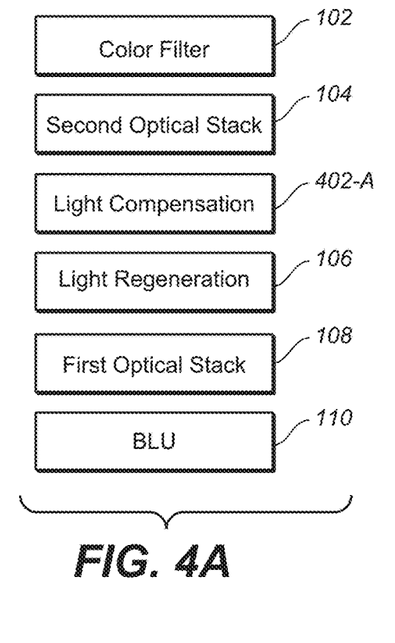
FIG. 4A and FIG. 4B illustrate example display device configuration with light compensation layers.

One or more light compensation layers (e.g., films, sheets, etc.) may be used in an optical configuration of a display device. FIG. 4A illustrates an example display device configuration comprising a BLU 110, a first optical stack 108, a light compensation layer 402-A, a light regeneration layer 106, a second optical stack 104, a color filter layer 102, etc. The light compensation layer 402-A may be an additional light regeneration layer in addition to the light regeneration layer (106) and may be configured to generate an illumination compensation pattern similar to one generated by the LCD pixel data cross-section (314) of FIG. 3B. The additional light regeneration layer as represented by the light compensation layer (402-A) can comprise one or more types of light regeneration materials such as quantum dots, etc., in one or more specific spatially non-uniform distribution patterns that are configured to generate compensating color light in some spatial regions of a display panel. Additionally, optionally, or alternatively, in place of, or in conjunction with, the light compensation layer (402-A), the light regeneration layer (106) can be replaced with a light regeneration layer that has one or more types of light regeneration materials such as quantum dots, etc., in one or more spatially non-uniform specific distribution patterns that are configured to generate illumination that compensates for weakness in some color light in some spatial regions of a display panel.

Figure 4B:
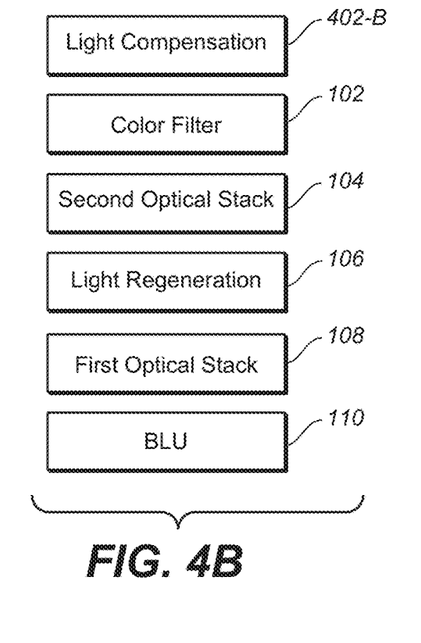

FIG. 4B illustrates an example display device configuration comprising a BLU 110, a first optical stack 108, a light compensation layer 402-B, a light regeneration layer 106, a second optical stack 104, a color filter layer 102, etc. The light compensation layer 402-B may be an additional color filter layer in addition to the color filter layer (102) and may be configured with light pass bands that generate an illumination compensation pattern similar to one generated by the LCD pixel data cross-section (314) of FIG. 3B. The additional color filter layer as represented by the light compensation layer (402-B) can comprise one or more types of color filtering materials in one or more specific spatially non-uniform distribution patterns that are configured to generate the illumination compensation pattern that compensates color light in some spatial regions of a display panel. Additionally, optionally, or alternatively, in place of, or in conjunction with, the light compensation layer (402-B), the color filter layer (102) can be replaced with a color filter layer that has one or more types of color filtering materials in one or more spatially non-uniform specific distribution patterns that are configured to generate illumination that compensates for weakness in some color light in some spatial regions of a display panel.

Any of a BLU (e.g., 110 of FIG. 1A, etc.), an optical stack (e.g., 108 or 104 of FIG. 1A, etc.), a light modulation layer, etc., in a display place can be added with, or modified into, a light compensation layer. For example, the BLU (110) may be modified (e.g., by an optical film coated on a light emitting surface, etc.) to generate an illumination compensation pattern as described herein. Similarly, an additional light compensation layer may be added in conjunction with a BLU to generate an illumination compensation pattern.

It should be noted that a light compensation layer is not limited to be placed in specific position in relation to other layers, components, etc. For example, an additional color filter layer that performs illumination compensation can be placed before, after, adjacent, away from, etc., a primary color filter layer (e.g., 102 of FIG. 1A, etc.). Similarly, an additional light regeneration layer that performs illumination compensation can be placed before, after, adjacent, away from, etc., a primary regeneration layer (e.g., 106 of FIG. 1A, etc.).

In some embodiments in which specific types of color light such as yellow color, etc., is lacking, light reflective materials (e.g., yellowish materials, etc.) may be added in various layers or spatial regions to recycle and regenerate the specific types of color light relative relatively efficiently. In some embodiments in which specific types of color light such as yellow color, etc., is lacking, light absorptive materials may be specifically selected to be placed in various layers or spatial regions to reduce the loss of the specific types of color light relative to other types of color light.

Techniques as described herein can be implemented by a variety of display devices. Examples of these display devices may include, but are not limited to, any of dual modulation display devices, multi-layer modulation display devices, display devices with global backlight, display devices with local dimming capabilities, etc.

7. Example Process Flow

Figure 5:
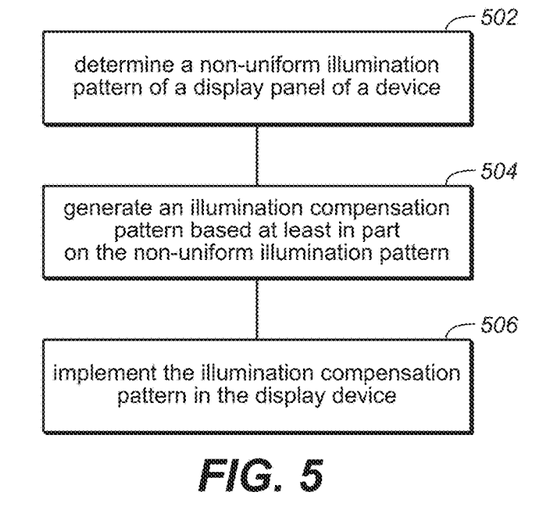
FIG. 5 illustrates an example process flow.

FIG. 5 illustrates an example process flow. In some embodiments, this process flow is performed through one or more computing devices or units. In block 502, an illumination compensation system (e.g., a display device that implements illumination compensation, a display device design system that implements illumination compensation in a class of display devices, etc.) determines a non-uniform illumination pattern of a display panel of a display device. The non-uniform illumination pattern comprises first values of one or more illumination properties in a first spatial region of the display panel and second different values of the one or more illumination properties in a second different spatial region of the display panel. The display panel comprises a plurality of spatial regions that include the first spatial region and the second spatial region.

In block 504, the illumination compensation system generates an illumination compensation pattern based at least in part on the non-uniform illumination pattern. The illumination compensation pattern is configured to homogenize values of the one or more illumination properties in the plurality of spatial regions that include the first spatial region and the second spatial region.

In block 506, the illumination compensation system implements the illumination compensation pattern in the display device.

In an embodiment, the non-uniform illumination pattern is generated by one or more components including a backlight unit (BLU). In an embodiment, the BLU comprises one or more of: laser light sources, light-emitting diodes (LEDs), cold cathode fluorescent lights (CCFLs), light regeneration materials, light recycling components, light guides, etc. In an embodiment, the light regeneration materials comprise one or more of: quantum dot materials, remote phosphor materials, etc.

In an embodiment, the display device comprises one or more backlight units (BLUs); one or more light modulation layers configured to modulate light transmitting through individual pixels in a plurality of pixels of the display panel; one or more color filter layers configured to impart designated primary colors to the individual pixels in the plurality of pixels; zero or more additional optical stacks; etc. In an embodiment, the one or more BLUs comprise at least one direct-lit BLU. In an embodiment, the one or more BLUs comprise at least one side-lit BLU.

In an embodiment, the non-uniform illumination pattern is determined with one or more test images. In an embodiment, the non-uniform illumination pattern is determined with direct illumination without test images.

In an embodiment, the non-uniform illumination pattern is determined based on measurements of the one or more illumination properties performed with respect to a reference display device that represents a class of display devices that include the display device.

In an embodiment, the non-uniform illumination pattern is determined based on measurements of the one or more illumination properties performed with respect to the display device.

In an embodiment, the non-uniform illumination pattern is determined based on simulation data generated by one or more simulation tools simulating a class of display devices that include the display device.

In an embodiment, the non-uniform illumination pattern is among one or more non-uniform illumination patterns that are determined at one or more different times, respectively, after the display device is delivered to an end user.

In an embodiment, the illumination compensation pattern is generated iteratively in reference to one or more previous illumination compensation patterns that have been previously generated for the display device.

In an embodiment, the two-dimensional non-uniform illumination pattern is approximated as a mathematical product of one or more single variable functions.

In an embodiment, the non-uniform illumination pattern is approximated as a mathematical series sum of products of single variable functions.

In an embodiment, the one or more illumination properties comprise one or more of white points, color gamuts, contrasts, dark levels, or bright levels.

In an embodiment, at least one of the first spatial region and the second spatial region comprises one or more of pixels, pixel blocks, other spatial regions representing portions of the display panel, etc.

In an embodiment, the illumination compensation pattern is implemented in the display device with an additional light modulation layer, in addition to a light modulation layer comprising light valves controlled by image data comprising image frames to be rendered with the display device; the additional light modulation layer is controlled by the illumination compensation pattern invariant with the image frames in the image data.

In an embodiment, the illumination compensation pattern is implemented in the display device with a light modulation layer comprising light valves controlled by image data comprising image frames to be rendered with the display device; the light modulation layer is controlled jointly by the image data and the illumination compensation pattern invariant with the image frames in the image data.

In an embodiment, the illumination compensation pattern is implemented in the display device with an additional color filter layer, in addition to a color filter layer configured with pass bands that impact primary colors on an individual pixel basis with the display device; the additional color filter layer is configured to generate the illumination compensation pattern invariant with image frames to be rendered by the display device.

In an embodiment, the illumination compensation pattern is implemented in the display device with a color filter layer configured with pass bands that impact primary colors on an individual pixel basis with the display device; the color filter layer is configured to generate the illumination compensation pattern invariant with image frames to be rendered by the display device.

In an embodiment, the illumination compensation pattern is implemented in the display device with additional light sources, in addition to a backlight unit (BLU) from which the non-uniform illumination pattern is partially originated; the additional light sources are configured to generate the illumination compensation pattern invariant with image frames to be rendered by the display device.

In an embodiment, the illumination compensation pattern is implemented in the display device with a backlight unit (BLU) with the display device; the BLU is configured to generate the illumination compensation pattern invariant with image frames to be rendered by the display device.

In an embodiment, a display device comprises a display panel having a plurality of spatial regions; and one or more components configured to implement an illumination compensation pattern, the illumination compensation pattern being generated based on a non-uniform illumination pattern of the display panel, the non-uniform illumination pattern comprising first values of one or more illumination properties in a first spatial region of the display panel and second different values of the one or more illumination properties in a second different spatial region of the display panel, the display panel comprising a plurality of spatial regions that include the first spatial region and the second spatial region.

In an embodiment, a display device is configured to perform any of the foregoing methods.

In an embodiment, an apparatus comprises a processor and is configured to perform any of the foregoing methods.

In an embodiment, a non-transitory computer readable storage medium, storing software instructions, which when executed by one or more processors cause performance of any of the foregoing methods.

In an embodiment, a computing device comprising one or more processors and one or more storage media storing a set of instructions which, when executed by the one or more processors, cause performance of any of the foregoing methods. Note that, although separate embodiments are discussed herein, any combination of embodiments and/or partial embodiments discussed herein may be combined to form further embodiments.

8. Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
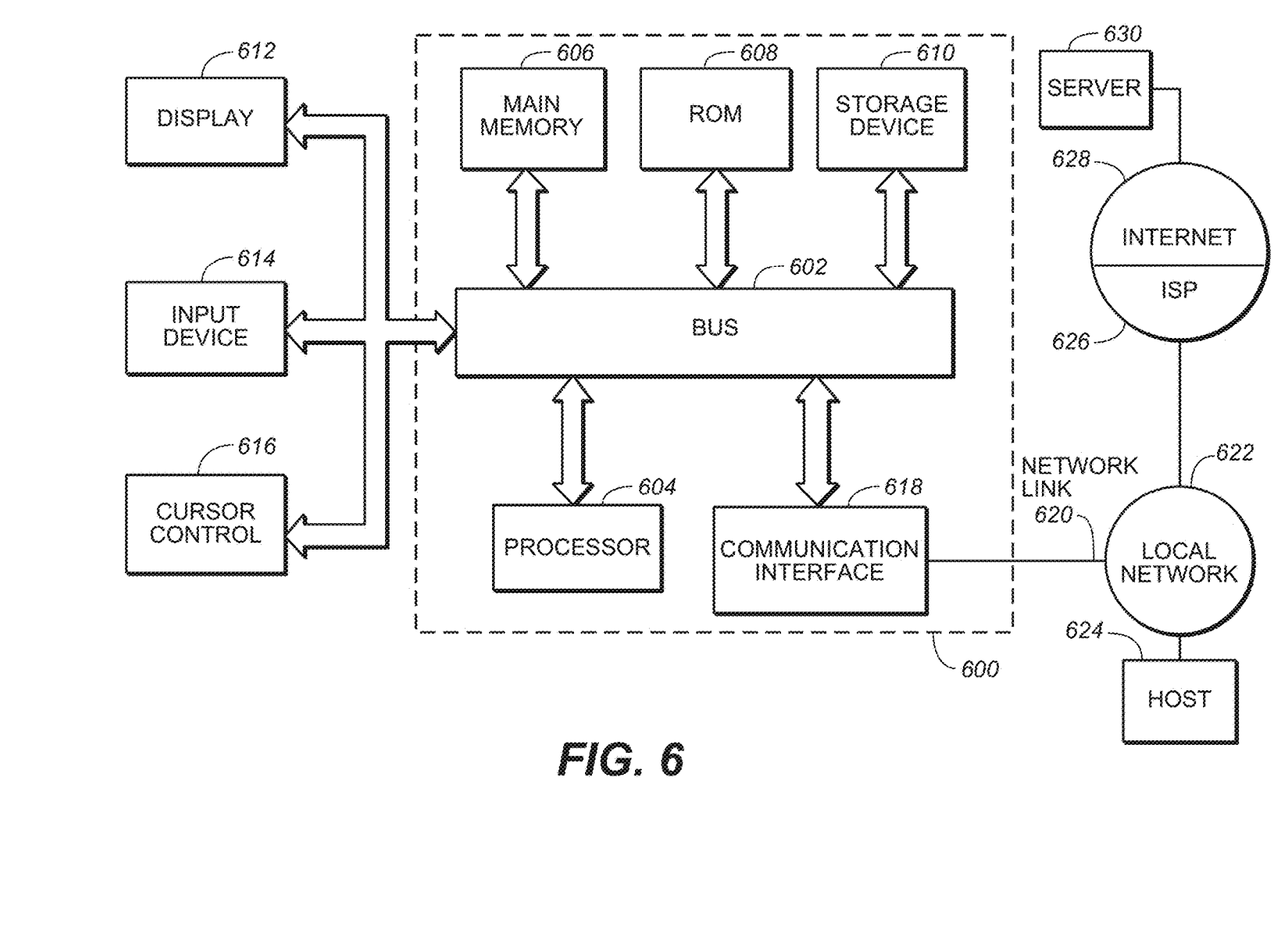
FIG. 6 illustrates an example hardware platform on which a computer or a computing device as described herein may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a liquid crystal display, for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques as described herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

9. Equivalents, Extensions, Alternatives and Miscellaneous

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

The invention claimed is:

1. A method for controlling a display, the display comprising a backlight and a display panel illuminated by the backlight, wherein the backlight comprises one or more back light sources and a quantum dot layer and the display panel comprises one or more light modulation layers, wherein one of the one or more light modulation layers comprises light valves, the method comprising:
   measuring color space values of the illumination in a first spatial region representing a first plurality of pixels of the display panel and in a second spatial region representing a second plurality of pixels of the display panel;
   determining a first white point and a first color gamut of the first spatial region and a second white point and a second color gamut of the second spatial region so as to obtain a non-uniform illumination pattern;
   deriving from the first and second white points and the first and second color gamuts of the first and second spatial region of the non-uniform illumination pattern transformation matrixes or transform functions representing deviations from a specific white point or a specific color gamut;
   generating an illumination compensation pattern configured to homogenize the color space values of the first and second pluralities of pixels in the first and second spatial region by computing inverse transformation matrixes that negate the deviations represented by the transformation matrixes or by computing inverse transform functions that negate the deviations represented by the transform functions;
   deriving drive values from algorithmic compensation implementing the illumination compensation pattern; and
   controlling the light valves with the drive values.

2. The method as recited in claim 1, wherein the transformation matrixes or transform functions represent deviations from both the specific white point and the specific color gamut.

3. A display device configured to perform the method as recited in claim 1.

4. An apparatus comprising a processor and configured to perform the method as recited in claim 1.

5. A non-transitory computer readable storage medium, storing software instructions, which when executed by one or more processors cause performance of the method as recited in claim 1.

6. A computing device comprising one or more processors and one or more storage media storing a set of instructions which, when executed by the one or more processors, cause performance of the method as recited in claim 1.

* * * * *